Patented Feb. 21, 1933

1,898,693

UNITED STATES PATENT OFFICE

ARNOLD SHEPHERDSON AND WILLIAM WYNDHAM TATUM, OF BLACKLEY, MANCHESTER, ENGLAND, ASSIGNORS TO IMPERIAL CHEMICAL INDUSTRIES LIMITED, OF LONDON, ENGLAND

DYES OF THE ANTHRAQUINONE SERIES

No Drawing. Application filed April 13, 1929, Serial No. 354,978, and in Great Britain April 19, 1928.

This invention relates to the production of new anthraquinone dyes; and it comprises a process wherein phenylenediamine compounds are condensed with certain halogenated anthraquinones; and it further comprises the new anthraquinone derivatives thus produced; all as more fully hereinafter set forth and as claimed.

Our new anthraquinone derivatives may be represented by the probable general formula

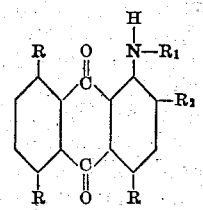

wherein $R_1$ represents hydrogen or an alkyl group, $R_2$ represents hydrogen, a halogen or a sulphonic group and R represents a residue having the following formula

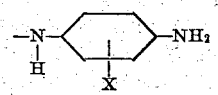

wherein X represents hydrogen or a sulphonic group and in which only one R represents said residue. We have found that such new anthraquinone derivatives may be advantageously used as dyes for various materials. The sulphonated products dye wool, silk, and cotton in valuable level and fast shades in an advantageous manner, the unsulphonated compounds especially those containing an alkyl amino group in position 1 dye cellulose esters or ethers in desirable even green shades in an advantageous manner. Such green shades on cellulose esters or ethers have not hitherto been obtainable by using a single dye of the anthraquinone series.

We have found the anthraquinone compounds having the following probable formula

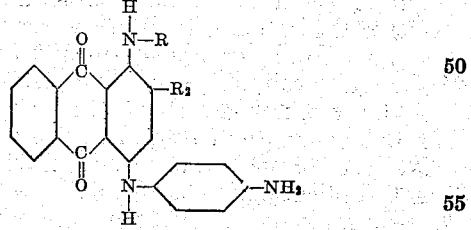

wherein $R_1$ represents hydrogen or an alkyl group and $R_2$ represents hydrogen, a halogen or a sulphonic group, to be especially advantageous.

We produce these dyes by a new method comprising condensing phenylenediamine compounds having the probable formula

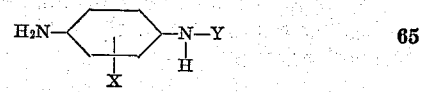

wherein X represents hydrogen or a sulphonic group and Y represents hydrogen or an acyl group, with anthraquinone derivatives having the probable formula

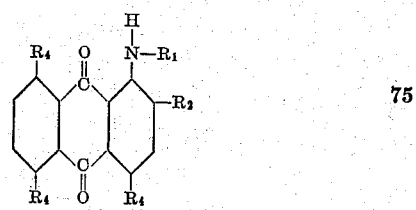

wherein $R_1$ represents hydrogen or an alkyl group, $R_2$ represents hydrogen, a halogen or a sulphonic group and $R_4$ represents hydrogen or a halogen and in which only 1 $R_4$ is a halogen. The said condensation may be effected in an aqueous medium. We have found that this condensation proceeds much more smoothly in an aqueous medium than in an organic solvent free from water. This is a surprising discovery as in the usual process using simply aryl amines instead of phenylenediamine, the condensation is effected in an organic solvent which must be free of even traces of water. The products obtained by our new method are pure and the yield is improved; an economy of materials being effected.

In carrying out our process we may use para-phenylenediamine or its mono-sulphonic acid derivative. Also the mono acylated derivative of para-phenylenediamine, for instance the acetyl or oxyl derivatives may be used. When an acyl derivative of para-phenylenediamine is employed the acyl group may be subsequently removed by hydrolysis. When $R_2$ is a halogen the compound may be treated with sodium sulphite and the halogen replaced with a nuclear sulphonic group. This is an advantageous manner of introducing a nuclear sulphonic group into the compound.

In my process the halogenated anthraquinone compounds may be advantageously either the bromine or chlorine derivatives.

This application is specifically directed to the anthraquinone derivatives useful as dyestuffs in which the $R_2$ is either hydrogen or a halogen. Our copending application Ser. No. 398,808 which is a division of the present application is specifically directed to the anthraquinone derivatives wherein $R_2$ is a sulphonic group. Also in our above identified divisional application we disclose and claim the process of introducing this nuclear sulphonic group into the anthraquinone compounds.

The following typical examples illustrate our invention and serve to guide those skilled in the art in using our broad invention to the best advantage. In the examples the parts are by weight.

*Example 1*

Preparation of 1-methyl amino-4-(p-amino-anilino anthraquinone.

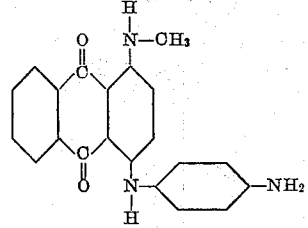

A mixture of 10 parts of 4-bromo-1-methyl amino anthraquinone, 6 parts of p-phenylenediamine and ½ part of copper acetate are introduced into 90 parts of hot saturated potassium carbonate solution (about 63 per cent). The whole is heated at 130° C. for 3 hours and is then diluted with water. The new dyestuff formed is insoluble and is filtered off and washed with dilute hydrochloric acid. When crystallized from aniline it forms green crystals insoluble in water or dilute caustic soda solution but giving a red solution in concentrated hydrochloric acid. Its solution in sulphuric acid is purple changing to a bluish-green on addition of formaldehyde. The solutions in acetic acid or methylated spirits are greenish-blue. The new dyestuff shows good affinity for acetate silk which is dyed in bluish-green shades of excellent fastness. On treatment with 20 per cent oleum at 40° C. it is converted into a soluble sulphonic acid which dyes wool in bluish-green shades.

*Example 2*

Preparation of 2-bromo-1-amino-4-(p-amino-anilino) anthraquinone.

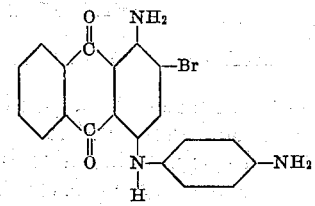

10 parts of 2:4-dibromo-1-aminoanthraquinone together with 5 parts of p-phenylenediamine and half a part of copper acetate are fed into 90 parts of 15 per cent caustic soda solution and boiled (at about 106° C.) for 2 hours. The precipitated base after filtering and washing with dilute acid may be purified by extraction with sulphuric acid of suitable strength such as 65 per cent. It is thereby obtained in the form of a blue powder insoluble in water or alkalies but giving a red solution with hydrochloric acid. The solution in methylated spirits is blue and in sulphuric acid violet changing to bluish-green on addition of formaldehyde.

The remaining bromine atom may be readily replaced by the sulphonic acid group, for example, by heating with sodium sulphite at 165° C. in aqueous phenol solution. The resultant sulphonic acid dissolves with a blue colour in water or alkalies, the solution becoming red when strongly acidified. A solution of the sulphonated dye in methylated spirits is blue, and in sulphuric acid it is blue which on addition of formaldehyde changes to green. From an acidulated bath, the new sulphonic acid dyes wool in level blue to green shades of excellent fastness. It has the probable formula

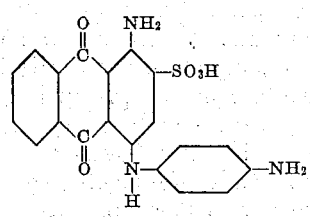

*Example 3*

This example gives an alternative method of preparing the new sulphonic acid described in Example 2 and which most probably has in the form of the sodium salt the constitution represented by the formula

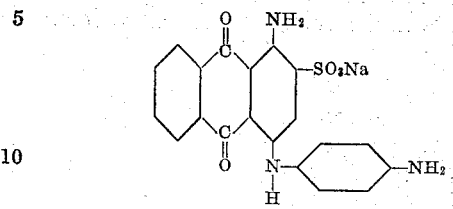

10 parts of 1-amino-4-bromo anthraquinone-2-sulphonic acid, 5 parts of p-phenylenediamine, 5 parts of soda ash and 0.2 parts of copper bronze are boiled for a few minutes with 60 parts of water and then treated with 0.2 parts of copper acetate. After boiling for 2 hours longer, the charge is acidified with acetic acid, and the crude colour filtered off and purified, for example, by extraction with dilute acid. The new dyestuff is identical in reactions with the sulphonic acid described in Example 2.

*Example 4*

20 parts of 1:5-aminochloroanthraquinone and 12 parts of p-phenylenediamine and 1 part of copper acetate are fed into a hot solution of 120 parts potassium carbonate in about 70 parts water. The charge is stirred at 125—130° C. for 3 hours then diluted with hot water and the 1-amino-5-aminoanilino-anthraquinone filtered off. It may be purified by extraction with dilute hydrochloric acid and crystallized from aniline. It forms bluish red crystals which dissolve in sulphuric acid giving a green coloured solution; addition of formaldehyde changes this green colour to a bright blue. A solution of this dye in methylated spirit is bluish red. It has the probable formula

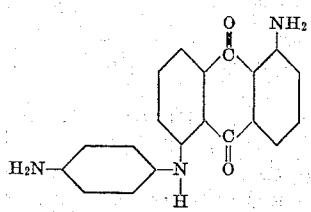

What we claim and desire to secure by Letters Patent is:

1. In the manufacture of new anthraquinone dyestuffs, the process which comprises condensing a phenylenediamine compound having the probable formula

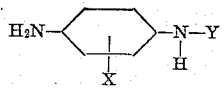

wherein X represents hydrogen or a sulphonic group and Y represents hydrogen or an acyl group, with a halogenated anthraquinone compound having the probable formula

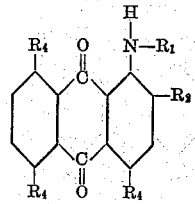

wherein $R_1$ represents hydrogen on an alkyl group, $R_2$ represents hydrogen, a halogen or a sulphonic group, and $R_4$ represents hydrogen or a halogen, and in which only one $R_4$ is a halogen, said condensation being effected in an alkalin aqueous medium.

2. In the manufacture of new anthraquinone dyestuffs, the process which comprises condensing paraphenylenediamine with a halogenated anthraquinone compound having the probable formula

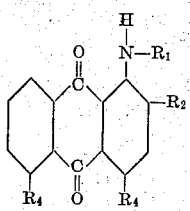

wherein $R_1$ represents hydrogen or an alkyl group, $R_2$ represents hydrogen, a halogen or a sulphonic group, and $R_4$ represents hydrogen or a halogen, and in which only one $R_4$ is a halogen, said condensation being effected in an alkalin aqueous medium.

3. In the manufacture of new anthraquinone dyestuffs, the process which comprises mixing together, in an aqueous medium, paraphenylenediamine and a halogenated anthraquinone compound having the probable formula

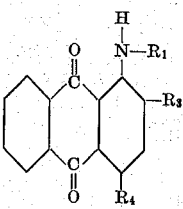

wherein $R_1$ represents hydrogen or an alkyl group, $R_3$ represents hydrogen or a halogen and $R_4$ represents a halogen, heating the aqueous mixture so obtained to effect reaction and condensation, and then separating the anthraquinone compound thus obtained from the aqueous reaction mixture.

4. In the manufacture of new anthraquinone dyestuffs, the process which comprises condensing paraphenylenediamine with 4-halogen-1-methylaminoanthraquinone.

5. As new products, anthraquinone compounds suitable as dyestuffs and having the probable formula

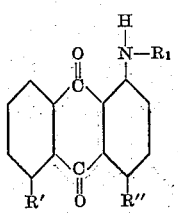

wherein $R_1$ represents hydrogen or an alkyl group and $R'$ and $R''$ represent hydrogen or a residue having the probable formula

and which contains only one such residue and in which $R_1$ represents an alkyl group when $R''$ represents said residue, the said anthraquinone compounds dyeing acetate silk in even blue to green shades.

6. As new products, anthraquinone compounds suitable as dyestuffs and having the probable formula

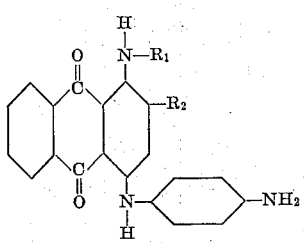

wherein $R_1$ represents hydrogen or an alkyl group, $R_2$ represents hydrogen, a halogen or a sulphonic group and in which $R_1$ represents an alkyl group when $R_2$ represents hydrogen, the said anthraquinone compounds being soluble in concentrated sulphuric acid, giving solutions varying from purple through blue to green in color, and being soluble in methylated spirit, giving blue to reddish blue solutions, the said anthraquinone compounds dyeing acetate silk and wool in bluish green to green shades.

7. As new products, anthraquinone compounds suitable as dyestuffs and having the probable formula

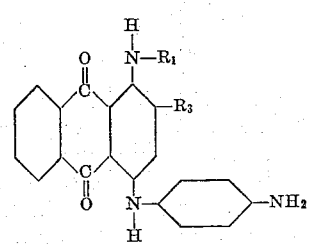

wherein $R_1$ represents hydrogen or an alkyl group, $R_3$ represents hydrogen or a halogen and in which $R_1$ represents an alkyl group when $R_3$ represents a hydrogen, the said anthraquinone compounds being soluble in concentrated sulphuric acid and in methylates spirit, the said anthraquinone compounds dyeing acetate silk in bluish green to green shades.

8. As a new product an anthraquinone compound suitable as a dyestuff and as an intermediate and having the probable formula

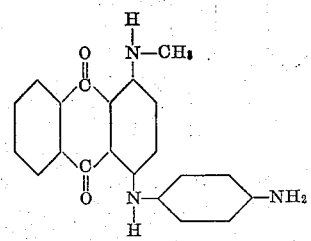

said anthraquinone compound occurring as green crystals insoluble in water or alkalies, dissolving in concentrated hydrochloric acid to give a red solution and in acetic acid or methylated spirit to give a greenish-blue solution, and dissolving in sulphuric acid to give a purple solution which on the addition of formaldehyde changes to bluish-green, the said dyestuff dyeing acetate silk in bluish-green shades.

9. In the manufacture of new anthraquinone dyestuffs, the process which comprises condensing paraphenylenediamine with an anthraquinone compound having the probable formula

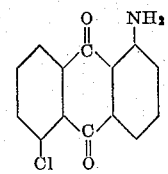

and recovering the condensation product thus produced, said condensation product being suitable as a dyestuff, the said dyestuff occurring as bluish red crystals which dissolve in sulphuric acid giving a green colored solution which on the addition of formaldehyde changes to a bright blue and which dissolve in methylated spirit giving a bluish red solution.

10. In the manufacture of new anthraquinone dyestuffs, the process which comprises condensing paraphenylenediamine with an anthraquinone compound having the probable formula

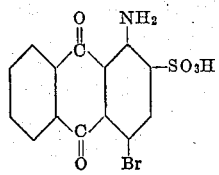

said condensation being effected in an alkalin aqueous solution, and recovering the condensation product thus produced, said condensation product being suitable as a dyestuff.

11. In the manufacture of new anthraquinone dyestuffs, the process which comprises condensing paraphenylenediamine with an anthraquinone compound having the probable formula

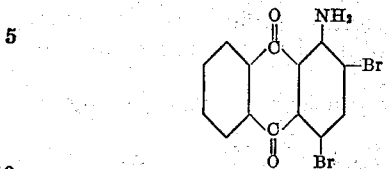

and recovering the condensation product thus produced, said condensation product being suitable as a dyestuff and as an intermediate.

12. In the manufacture of new anthraquinone dyestuffs, the process which comprises condensing paraphenylenediamine with an anthraquinone compound having the probable formula

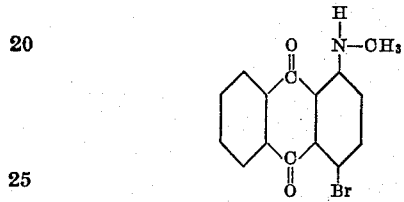

and recovering the condensation product thus produced, said condensation product being suitable as a dyestuff.

13. As new products, anthraquinone compounds suitable as dyestuffs and as intermediates and having the probable formula

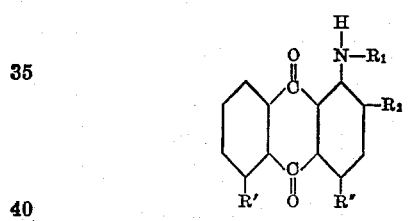

wherein $R_1$ represents hydrogen or a methyl group, $R_2$ represents hydrogen, bromine or a sulphonic group and R′ and R″ represent hydrogen or the residue

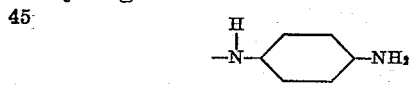

and in which $R_1$ represents a methyl group when $R_2$ and R″ represent hydrogen and said residue, respectively, the said compound having one and only one such residue.

14. As a new product an anthraquinone compound suitable as a dyestuff and as an intermediate and having the probable formula

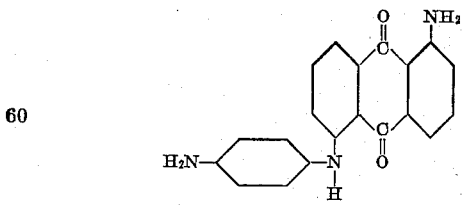

said anthraquinone compound occurring as bluish red crystals dissolving in sulphuric acid to give a green colored solution which on the addition of formaldehyde changes to a bright blue and dissolving in methylated spirit giving a bluish red solution.

15. As a new product, an anthraquinone compound suitable as a dyestuff and as an intermediate and having the probable formula

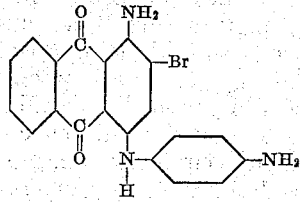

said anthraquinone compound being a blue powder insoluble in water or alkalies, dissolving in hydrochloric acid to give a red solution and in methylated spirit to give a blue solution, and dissolving in sulphuric acid to give a violet solution which on the addition of formaldehyde changes to bluish green.

16. In the manufacture of new anthraquinone dyestuffs, the process which comprises condensing paraphenylenediamine with a halogenated anthraquinone compound having the probable formula

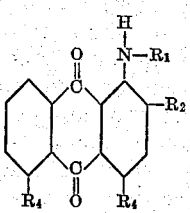

wherein $R_1$ represents hydrogen or a methyl group, $R_2$ represents hydrogen, bromine or a sulphonic group and $R_4$ represents hydrogen or a halogen, one $R_4$ being hydrogen, and the other being a halogen said condensation being effected in an alkalin aqueous solution, and recovering the condensation product thus produced, said condensation product being suitable as a dyestuff.

17. As new products, suitable as dyestuffs and as intermediates, the anthraquinone compounds of the class consisting of 1-methylamino-4-(para-amino-anilino)-anthraquinone, 2-bromo-1-amino-4-(para-amino-anilino)-anthraquinone, 1-amino-2 sulphonic acid-4-(para-amino-anilino)-anthraquinone and 1-amino-5-(para-amino-anilino)-anthraquinone.

18. In the manufacture of new anthraquinone compounds suitable as dyestuffs and as intermediates by processes involving condensing paraphenylenediamine compounds with halogenated anthraquinone compounds, the steps which comprise mixing together about 10 parts of 4-bromo-1-methylamino anthraquinone, about 6 parts of paraphenylenediamine and a small amount of copper acetate, in a hot saturated potassium carbonate solution, heating the aqueous mixture thus obtained to about 130° C. until reaction and condensation are effected, diluting the reaction mixture with water and isolating and recovering the anthraquinone compound thus obtained, said compound having a good affinity for acetate silk which is dyed by it to bluish green shades of excellent fastness.

19. In the manufacture of new anthraquinone compounds suitable as dyestuffs and as intermediates by processes involving condensing paraphenylenediamine compounds with halogenated anthraquinone compounds, the steps which comprise mixing together about 10 parts of 2:4 dibromo-1-amino-anthraquinone, about 5 parts of paraphenylenediamine and a small amount of copper acetate, in a caustic soda solution, boiling the aqueous mixture thus obtained until reaction and condensation are effected, and then isolating and recovering the anthraquinone compound thus obtained in the form of a blue powder insoluble in water.

20. In the manufacture of new anthraquinone compounds suitable as dyestuffs and as intermediates by processes involving condensing paraphenylenediamine compounds with halogenated anthraquinone compounds, the steps which comprise mixing together about 10 parts of 1-amino-4-bromo-anthraquinone-2-sulphonic acid, about 5 parts of paraphenylenediamine and a small amount of copper bronze and copper acetate, in an aqueous solution of soda ash, boiling the aqueous mixture thus obtained until reaction and condensation are effected, and then isolating and recovering the anthraquinone compound thus obtained.

21. In the manufacture of new anthraquinone compounds suitable as dyestuffs and as intermediates by processes involving condensing paraphenylenediamine compounds with halogenated anthraquinone compounds, the steps which comprise mixing together about 20 parts of 1:5 aminochloro-anthraquinone, about 12 parts of paraphenylenediamine and a small amount of copper acetate in a hot aqueous solution of potassium carbonate, heating the aqueous mixture thus obtained at between 125 and 130° C. until reaction and condensation are effected, diluting the aqueous reaction mixture thus obtained with hot water and then isolating and recovering the anthraquinone compound thus produced.

22. In the manufacture of new anthraquinone compounds suitable as dyestuffs and as intermediates by processes involving condensing paraphenylenediamine compounds with halogenated anthraquinone compounds, the steps which comprise mixing together a 1-amino-anthraquinone compound having a halogen substituent in any one of the other alpha positions with approximately a molecular proportion of paraphenylenediamine compound and a small amount of copper acetate, in an alkaline aqueous medium, heating the aqueous mixture thus obtained until reaction and condensation are effected, and then separating the anthraquinone condensation product thus obtained from the aqueous reaction mixture.

In testimony whereof we affix our signatures.

ARNOLD SHEPHERDSON.
WILLIAM WYNDHAM TATUM.